(12) United States Patent
Shiner, Jr. et al.

(10) Patent No.: US 8,511,623 B1
(45) Date of Patent: Aug. 20, 2013

(54) CONDUIT HARDWARE AND RELATED ASSEMBLIES AND METHODS

(75) Inventors: Jimmy Maurice Shiner, Jr., Leesburg, FL (US); Kevin Paul Kruger, Clermont, FL (US)

(73) Assignee: SNK Innovations, LLC, Clermont, FL (US)

( * ) Notice: Subject to any disclaimer, the term of this patent is extended or adjusted under 35 U.S.C. 154(b) by 257 days.

(21) Appl. No.: 12/847,532

(22) Filed: Jul. 30, 2010

Related U.S. Application Data

(60) Provisional application No. 61/271,960, filed on Jul. 30, 2009.

(51) Int. Cl.
*F16L 3/00* (2006.01)
*F16L 3/08* (2006.01)
*F16B 7/04* (2006.01)
*E04H 3/00* (2006.01)
*E04B 1/06* (2006.01)

(52) U.S. Cl.
USPC .......... 248/49; 248/65; 52/239; 403/180; 403/217; 403/384

(58) Field of Classification Search
USPC ............ 248/49, 65, 68.1, 73, 225.11, 316.1, 248/74.2, 220.21; 403/170, 177, 180–184, 403/187, 217, 384, 397–400; 52/239, 656.9
See application file for complete search history.

(56) References Cited

U.S. PATENT DOCUMENTS

| | | | | | |
|---|---|---|---|---|---|
| 3,216,683 | A | * | 11/1965 | Girard | 248/68.1 |
| 3,500,862 | A | * | 3/1970 | Hansel | 137/624.13 |
| 3,526,934 | A | * | 9/1970 | Owen, Sr. | 285/154.1 |
| 3,602,871 | A | * | 8/1971 | Newman | 439/724 |
| 3,834,549 | A | * | 9/1974 | Burg et al. | 403/175 |
| 3,899,005 | A | * | 8/1975 | Klimpl | 248/68.1 |
| D361,750 | S | * | 8/1995 | Ansley | D13/151 |
| 5,477,774 | A | * | 12/1995 | Ikumi | 92/161 |
| 5,580,181 | A | * | 12/1996 | Nomura | 403/170 |
| 6,044,990 | A | * | 4/2000 | Palmeri | 403/217 |
| 6,128,876 | A | * | 10/2000 | Nitschke et al. | 52/239 |
| 6,336,802 | B1 | * | 1/2002 | Hall | 425/77 |
| 7,156,703 | B1 | * | 1/2007 | Hurley et al. | 439/814 |
| 7,186,104 | B2 | * | 3/2007 | Hall et al. | 425/77 |
| 2009/0224111 | A1 | * | 9/2009 | Gilbreath | 248/68.1 |

* cited by examiner

*Primary Examiner* — Tan Le
(74) *Attorney, Agent, or Firm* — Allen, Dyer, Doppelt, Milbrath & Gilchrist, P.A.

(57) ABSTRACT

A conduit hardware article includes a body forming an approximately rectangular solid defining a first threaded bore extending between generally opposed first and second sides thereof, and a second threaded bore extending between generally opposed third and fourth sides thereof generally perpendicular to the first threaded bore. Slots opening onto the first side can be defined in fifth and sixth sides of the body. The hardware article can be used to attach multiple conduit hardware components to a single threaded rod.

9 Claims, 5 Drawing Sheets

US 8,511,623 B1

CONDUIT HARDWARE AND RELATED ASSEMBLIES AND METHODS

CROSS-REFERENCE TO RELATED APPLICATION

This application claims the benefit of U.S. Provisional Application Ser. No. 61/271,960, filed on Jul. 30, 2009, the contents of which are herein incorporated by reference in their entirety.

FIELD OF THE INVENTION

The present invention relates to hardware used in connection with the installation of conduit runs, and more particularly to hardware used in connection with securing other conduit hardware components to threaded rods.

BACKGROUND OF THE INVENTION

Construction projects frequently require the extensive installation and routing of conduit. The conduit is generally required to be supported at predetermined intervals and generally is not permitted to serve as the sole structural support for hardware components connected thereto. For example, building codes governing electrical conduit runs descending from a ceiling into a wall to connect to a junction box typically require a trapeze to be used together with the conduit. The trapeze generally includes a strut suspended from a pair of threaded rods to bear the weight of the conduit run and the box. The assembly and installation of trapezes and other conduit support structures can greatly increase the time and material required to complete a given conduit installation.

SUMMARY OF THE INVENTION

In view of the foregoing, it is an object of the present invention to provide an improved conduit hardware article, related conduit hardware assemblies and methods of use. "Conduit" is used herein in a generic sense, and can refer to generally enclosed conduits, such as pipes or tubes, without distinction as to a particular use or material of the conduit unless otherwise specified. For example, electrical conduit, as well as plumbing pipes and condensate drain lines, are encompassed the term "conduit."

According to an embodiment of the present invention, a conduit hardware article includes a body forming an approximately rectangular solid defining a first threaded bore extending between generally opposed first and second sides thereof, and a second threaded bore extending between generally opposed third and fourth sides thereof generally perpendicular to the first threaded bore. According to an aspect of the present invention, slots opening onto the first side can be defined in fifth and sixth sides of the body.

According to another embodiment of the present invention, a conduit hardware assembly includes a hardware article having a body forming an approximately rectangular solid defining a first threaded bore extending between generally opposed first and second sides thereof, a second threaded bore extending between generally opposed third and fourth sides thereof generally perpendicular to the first threaded bore, and a first slot opening onto the first side and extending down a portion of a fifth side along a first slot axis, a threaded rod extending through one of the first and second threaded bores, and first and second conduit hardware components connected to the threaded rod by the hardware article.

According to a method aspect of the present invention, a method of suspending a plurality of conduit runs from a single threaded rod includes threading the rod through a first threaded bore of a hardware article, connecting a first conduit clamp to one side of the hardware article, connecting a second conduit clamp to another side of the hardware article, and connecting first and second conduit runs to the first and second conduit clamps, respectively.

These and other objects aspects and advantages of the present invention will be better appreciated in view of the drawings and following detailed description of preferred embodiments.

BRIEF DESCRIPTION OF THE DRAWINGS

Referring to FIG. 1, according to an embodiment of the present invention, a conduit hardware article 10 includes an approximately rectangular solid body 12, most preferably an approximately cubic body. The body 12 defines first and second threaded bores 14, 16 and first and second slots 20, 22. Preferably, the body 12 is cast or otherwise fabricated from metal, such as hardened steel, iron, aluminum or copper, with the bores and slots being machined therein.

Figure 1:
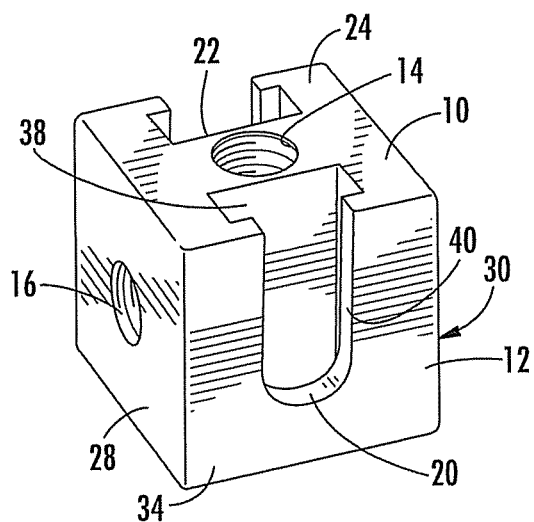
FIG. 1 is a perspective view of a conduit hardware article, according to an embodiment of the present invention.

The first threaded bore 14 extends between generally opposed first and second sides 24, 26 of the body 12. The second threaded bore 16 extends between generally opposed third and fourth sides 28, 30 of the body and is approximately perpendicular to the first threaded bore 14. The diameter of the bores 14, 16 and the thread configuration are preferably the same and selected to conform to widely used threaded fastener sizes. The threaded bores 14, 16 can be continuous or either bore can be formed in non-continuous segments.

The first and second slots 20, 22 extend from the first side 24 down respective portions of generally opposed fifth and sixth sides 34, 36 along generally parallel first and second slot axes. The first and second slots 20, 22 each include an inner portion 38 and an outer portion 40. The across the fifth and sixth sides 34, 36 in a direction generally perpendicular to the slot axes, the inner portion 39 is wider than the outer portion 40. This arrangement allows the head of a threaded fastener to be inserted into the inner portion 40 with the stem extending outwards through the outer portion 38. The outer portion 38 prevents the head from being removed if pulled from the fifth or sixth sides 34, 36.

Figure 2:
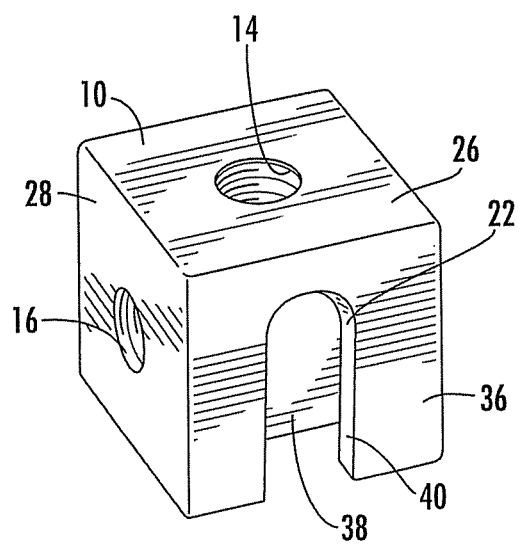
FIG. 2 is another perspective view of the article of FIG. 1.

The configuration of threaded bores 14, 16 and slots 20, 22 in FIGS. 1 and 2 is believed to represent a preferred embodiment; however, the present invention is not necessarily limited thereto. For instance, other numbers and configurations of bores and slots could be used. For instance, a bore on one side could be opposed to a slot on another. Also, male and/or female threaded protrusions could be included on the article extending from one or more sides of the body.

Figure 3:
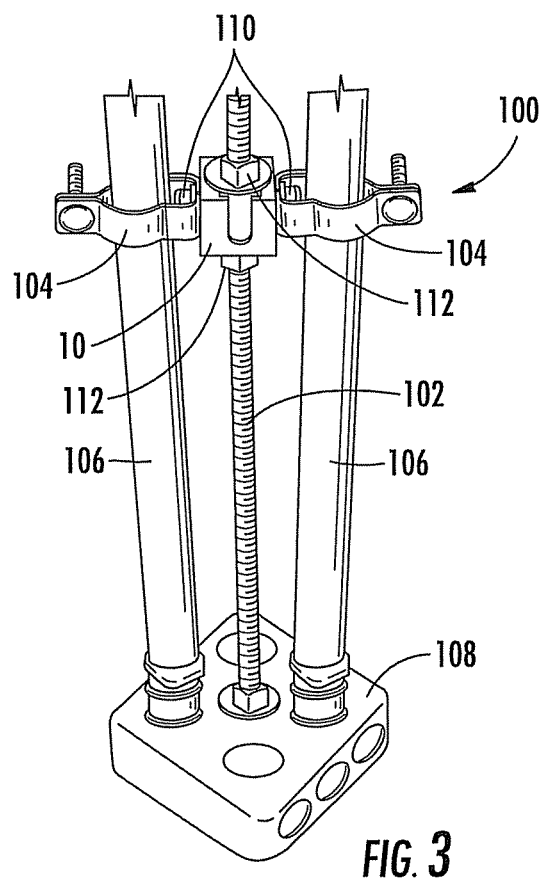
FIGS. 3-8 are perspective views conduit hardware assembly including the article of FIG. 1, according to further embodiments of the present invention.

Referring to FIG. 3, according to another embodiment of the present invention, a conduit hardware assembly 100 includes the hardware article 10, a threaded rod 102, and a pair of conduit clamps 104 connected to the threaded rod 102 by the hardware article 10. The hardware article 10 is threaded onto the rod 102 via the first threaded bore 14 (see FIGS. 1 and 2). It will be appreciated that the article 10 allows the single rod 102 to two vertical conduit runs 106 and a junction box 108. "Junction box" as used herein can also include outlet and fixture boxes.

The conduit clamps 104 are attached to the hardware article 10 by inserting threaded fasteners 110 through the conduit clamps 104 and into opposite ends of the second threaded bore 16 (see FIGS. 1 and 2). Nuts 112 can be applied to one or both ends of the article 10 around the rod 102 to help prevent unwanted rotation. Washers or other spacers can also be employed as necessary.

Figure 4:
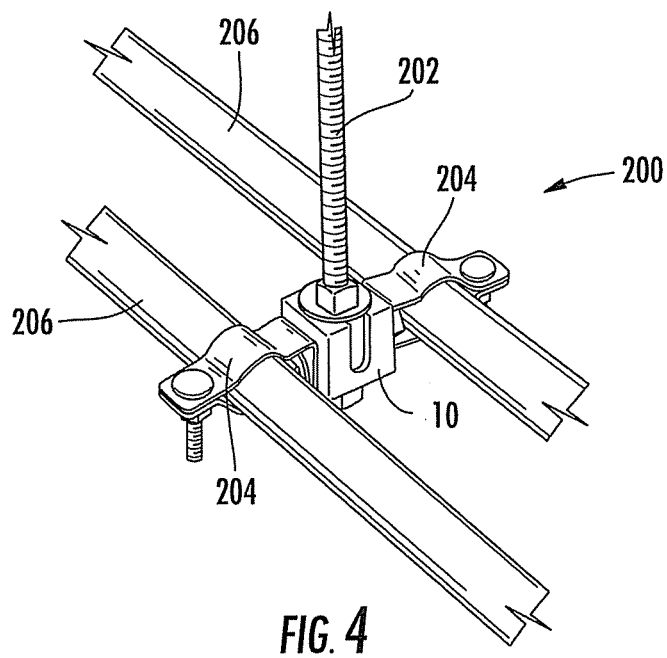

Referring to FIG. 4, according to a further embodiment of the present invention, a conduit hardware assembly 200 includes the hardware article 10, a threaded rod 202, and a pair of conduit clamps 204 connected to the threaded rod 202 by the hardware article 10. It will be appreciated that the article 110 allows the single rod 202 to support to two horizontal conduit runs 206.

Figure 5:
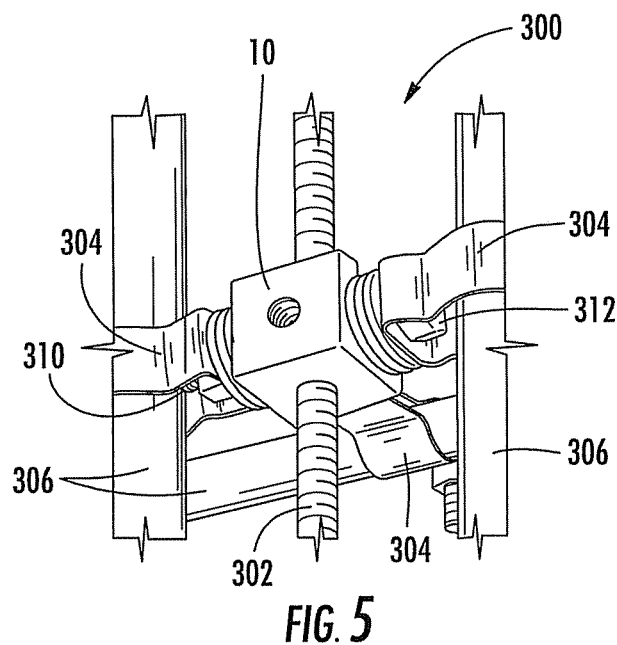

Referring to FIG. 5, according to an additional embodiment of the present invention, a conduit hardware assembly 300 includes the hardware article 10, a threaded rod 302, and a plurality of conduit clamps 304 connected to the threaded rod 302 by the hardware article 10. It will be appreciated that the article 110 allows the single rod 302 to support to three or more horizontal conduit runs 206, including runs oriented in different directions.

In the assembly 300, two of the conduit clamps 304 are connected to the article 10 by threaded fasteners 310 having heads inserted in opposite slots 20, 22 (see FIGS. 1 and 2). The stems are routed through the clamps 304 and secured by bolts 312.

Figure 6:
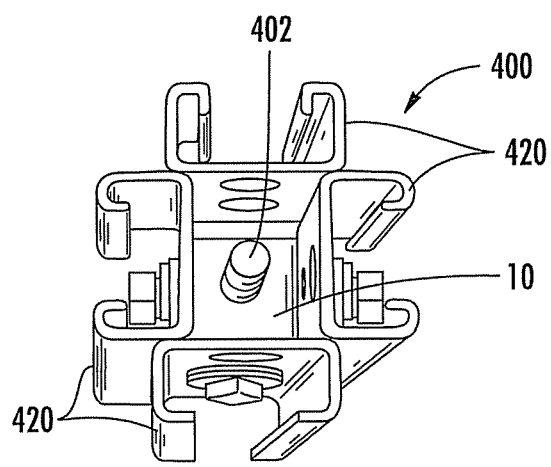
Figure 7:
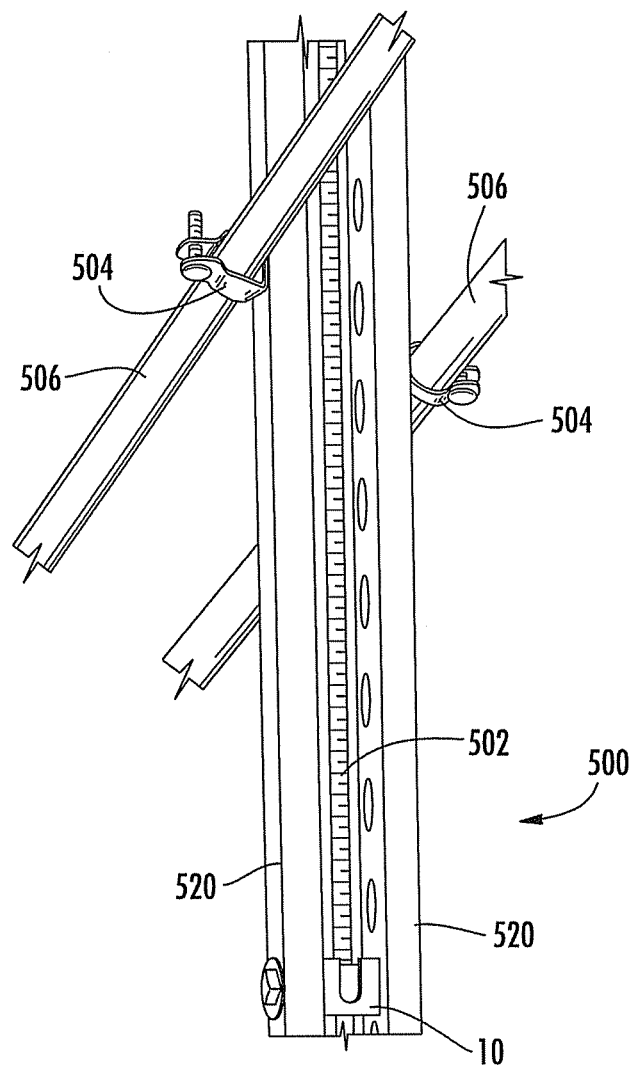

Other conduit hardware components besides conduit clamps 304 can be connected using the article 10. For instance, referring to FIG. 6, according to another embodiment of the present invention, a conduit hardware assembly 400 includes the hardware article 10, a threaded rod 402, and a plurality of conduit struts 420 connected to the threaded rod 402 by the hardware article 10. Referring to FIG. 7, in an assembly 500, a plurality of conduit struts 520 are connected to the article 10, which is threaded on the threaded rod 502. The struts 520 support a plurality of conduit runs 506 via conduit clamps 504.

Figure 8:
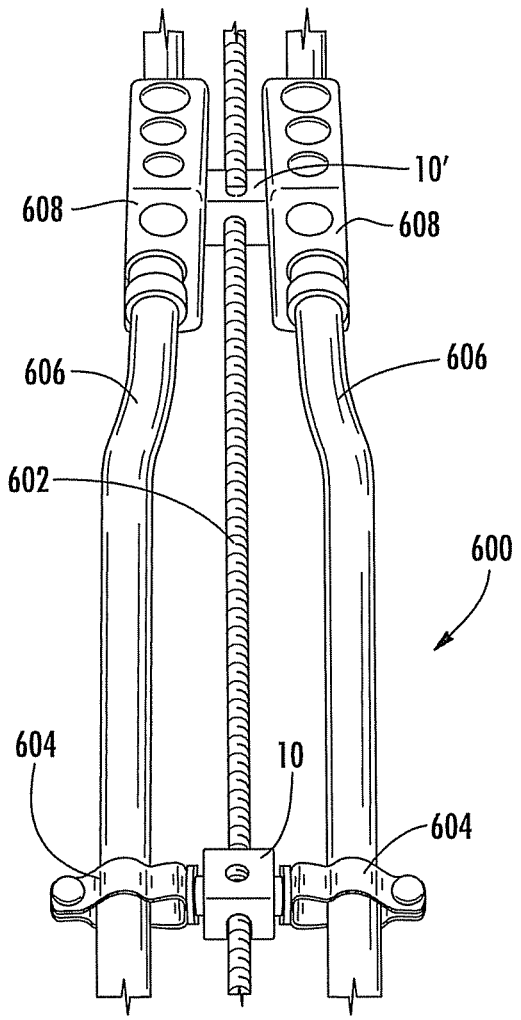

Additionally, multiple articles can be threaded on the same rod. For example, referring to FIG. 8, according to a further embodiment of the present invention, a hardware assembly 600 includes the article 10 and another article 10' threaded onto a threaded rod 602. The article 10 connects a pair of conduit clamps 604 to the threaded rod 602, and the article 10' connects a pair of junction boxes 608 to the threaded rod 602. In the depicted embodiment, conduit runs 606 extend between the clamps 604 and the junction boxes 608.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A conduit hardware article comprising:
  a body forming an approximately rectangular solid defining
    a first threaded bore extending between generally opposed first and second sides thereof,
    a second threaded bore extending between generally opposed third and fourth sides thereof generally perpendicular to the first threaded bore, and
    wherein the body further defines a first slot opening onto the first side and extending down a portion of a fifth side along a first slot axis.

2. The article of claim 1, wherein the body is approximately cubic.

3. The article of claim 1, wherein the first slot includes an inner portion and an outer portion, the inner portion being wider than the outer portion in a direction along the fifth side perpendicular to the first slot axis.

4. The article of claim 1, wherein the body further defines a second slot opening onto the first side and extending down a portion of a sixth side along a second slot axis.

5. The article of claim 4, wherein the first and second slot axes are generally parallel.

6. The article of claim 5, wherein the first and second slots each include an inner portion and an outer portion, the inner portion being wider than the outer portion in a direction along the fifth and sixth sides, respectively, perpendicular to the first slot axis.

7. A conduit hardware article comprising:
  a body approximately forming a cube defining
    a first threaded bore extending between generally opposed first and second sides thereof,
    a second threaded bore extending between generally opposed third and fourth sides thereof generally perpendicular to the first threaded bore,
    a first slot opening onto the first side and extending down a portion of a fifth side along a first slot axis, and
    a second slot opening onto the first side and extending down a portion of a sixth side along a second slot axis, approximately parallel with the first slot axis,
    wherein the first and second slots each include an inner portion and outer portion extending along their respective first and second slot axes, the inner portion being wider than the outer potion such that a threaded fastener head can be inserted into the inner portion from the first side with a threaded fastener stem extending outwardly through the outer portion generally perpendicular to the fifth and sixth side, respectively, the outer portion preventing removal of the threaded fastener in a direction perpendicular to the fifth and sixth side, respectively.

8. The article of claim 1, wherein both of the first and second threaded bores permit a threaded rod to be threaded completely therethrough.

9. The article of claim 7, wherein both of the first and second threaded bores permit a threaded rod to be threaded completely therethrough.

* * * * *